United States Patent [19]
Steadman

[11] Patent Number: 5,481,766
[45] Date of Patent: Jan. 9, 1996

[54] TOILET GUARD

[76] Inventor: James Steadman, 4423 64th Ave., SE., Olympia, Wash. 98513

[21] Appl. No.: 288,680

[22] Filed: Aug. 9, 1994

[51] Int. Cl.[6] ................................................. A47K 17/00
[52] U.S. Cl. ................................................. 4/661; 4/286
[58] Field of Search .................... 4/286, 292, 256.1, 4/661; 43/64, 65

[56] References Cited

U.S. PATENT DOCUMENTS

| | | | |
|---|---|---|---|
| 1,395,680 | 11/1921 | Kasprzyk | 43/64 |
| 2,281,448 | 4/1942 | Mathey. | |
| 3,885,341 | 5/1975 | Kuchenbecker et al. | 43/65 |
| 4,307,476 | 12/1981 | Halstad. | |
| 4,555,818 | 12/1985 | Harrington. | |
| 5,090,152 | 2/1992 | Ling | 43/64 |

*Primary Examiner*—Charles E. Phillips
*Attorney, Agent, or Firm*—Brian J. Coyne

[57] ABSTRACT

A guard for repelling rats and other animals from entering a toilet bowl fixture installed on a wax sealing ring. The guard comprises a guard tube and a plurality of flexible, resilient wires having their base ends attached to circumferentially-spaced points of the tube and their free ends extending longitudinally and radially inward in a generally truncated, conelike formation. When the toilet is flushed, the wires spread radially outward to permit human waste and wads of toilet paper to easily pass. When an animal attempts to enter a toilet bowl fixture from an attached sewer line, however, pressure by the animal against the wires moves the wires radially inward to obstruct passage of the animal.

5 Claims, 3 Drawing Sheets

TOILET GUARD

BACKGROUND OF THE INVENTION

1. Field of the Invention

This invention relates generally to devices for preventing undesired objects from passing between a toilet bowl fixture and a waste line system. More particularly, this invention relates to devices for preventing rats, snakes and other animals from emerging from a waste line system into a toilet bowl.

2. Prior Art

A conventional toilet bowl fixture designed for a floor mount installation includes an annular discharge flange at the base thereof. A wax ring mounted between the discharge flange of the toilet bowl fixture and the sewer line functions to seal the toilet against leakage between the discharge flange and the sewer line.

Various devices have been disclosed in the prior art for preventing foreign objects such as sanitary napkins and disposable diapers from being flushed from a toilet bowl fixture into a waste line system. Such devices are intended to prevent flushing of such foreign objects into a sewer line while at the same time avoiding interference with the passage of water, toilet paper and human waste into the line.

Halstad, U.S. Pat. No. 4,307,476, disclosed an expansible ring made of non-ferrous wire or the like, having at circumferentially-spaced points a series of hook-like members made of wire that extend radially of the ring. Each of the members included a straight portion extending radially outwardly, a downwardly-extending portion extending perpendicularly to the straight portion, an inwardly extending portion, and a terminal portion extending angularly with respect to the inwardly extending portion and terminating in a point. In use, the device was embedded in a wax ring underlying the discharge flange of a floor-mounted toilet bowl fixture. The sharp point of the hooks shred toilet tissue and also acted as hooks to catch undesirable material and prevent it from entering sewer lines. A disadvantage of Halstad's device is that it would not prevent the movement of solid objects, such as a can, container, or a small live animal, between a sewer line and an attached toilet bowl fixture.

Harrington, U.S. Pat. No. 4,555,818, disclosed a waste line trap for placement within a discharge conduit of a toilet bowl fixture comprising a cylinder and a plurality of inwardly extending fins having flat side walls and downwardly beveled top surfaces. Although Harrington's trap prevented the discharge into a sewer line of solid objects such as cans and containers while simultaneously permitting normal flushing of a toilet bowl fixture, it did not provide an adequate barrier to prevent movement of small animals from a sewer line into a toilet bowl fixture.

Mathey, U. S. Pat. No. 2,281,448, disclosed a device for partially obstructing a pipe, intended, for example, to be inserted in the fill pipe of a gasoline tank, which would permit entrance of gasoline into the tank while at the same time prohibiting the admission of a siphon tube into the tank. Mathey's device comprised a plurality of rodlike members, which may be of relatively stiff and strong wire, the ends of which were collected and secured. The wires were of two different lengths and arranged in a generally conical formation such that the bases of the two cones thus formed were of greater diameter than the inside diameter of the pipe with which the device was to be used. The base ends of the longer wires were bent outwardly to form hooklike portions while the base ends of the shorter wires were straight. In use, the apex portion of the device was first inserted into a pipe with the conical bases retracted; the device was then further inserted into the pipe and the compressed wires were permitted to spring radially outward, thereby locking the device in place. Mathey's device is wholly unsuited to repel live animals attempting to enter a toilet bowl fixture from a sewer line, however, because regardless of where it is positioned or how it is oriented it would interfere with the normal flushing of the toilet.

Thus, there remains a need for a device that is capable of repelling the movement of small live animals from a sewer line into a toilet bowl fixture without interfering with the normal flushing of the toilet.

SUMMARY OF THE INVENTION

The invention has as its principal object the provision of a device for preventing the movement of small, live animals, such as rats and snakes, from a sewer line into a toilet bowl fixture, and which does not interfere with the normal flushing of the toilet.

Another object of the invention is to provide a device of the character described, which is readily adaptable for use in connection with any of the standard or present day toilet bowls without any changes in the bowls or sewer connections from the bowls.

These and other objects of this invention will become apparent to those skilled in the art from a view of the attached drawings and the following specification.

DESCRIPTION OF THE PREFERRED EMBODIMENT

Figure 8:
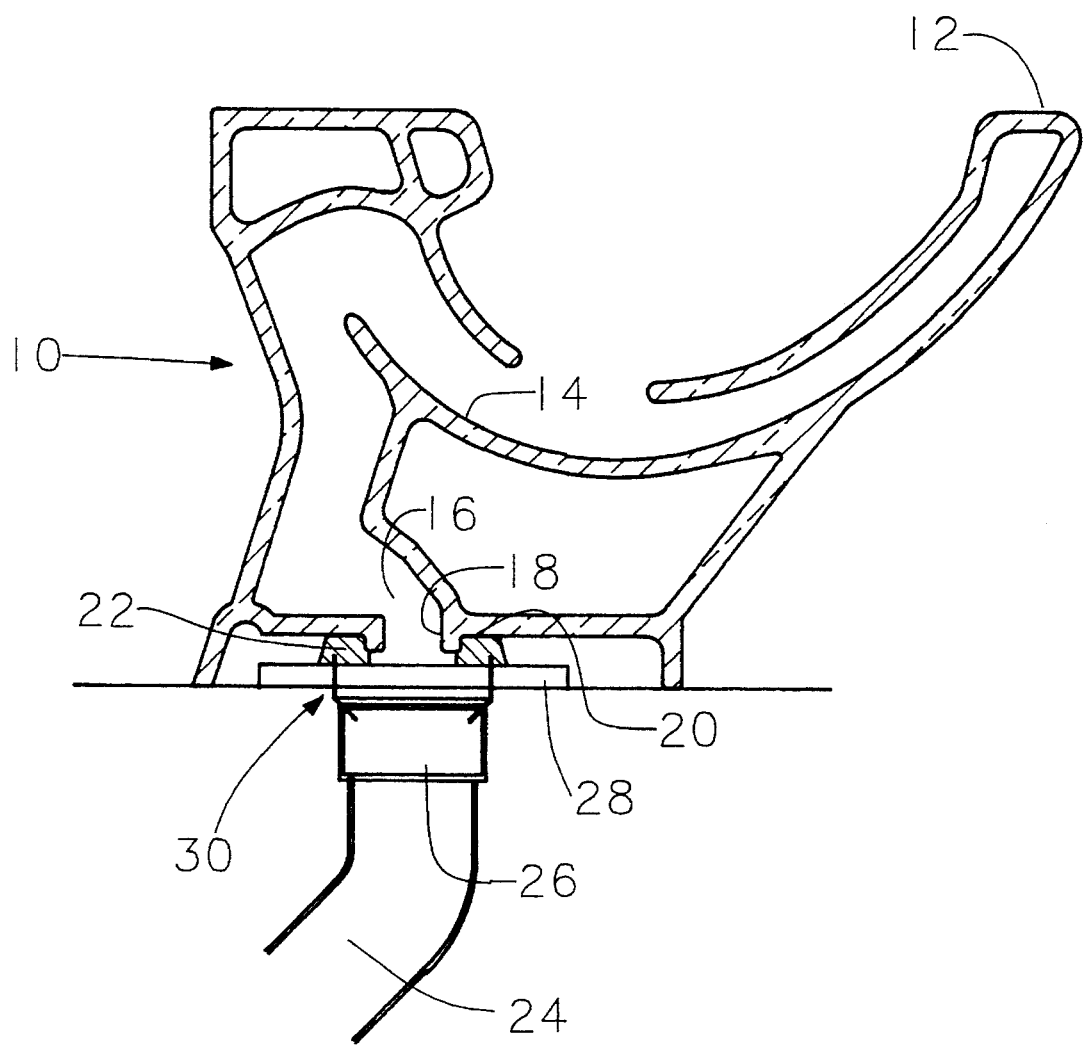
FIG. 8 is a cross-sectional view of a floor-mounted toilet bowl fixture showing the toilet guard partially embedded in a wax ring.

Without limiting the scope of the invention, the preferred embodiment is hereinafter set forth. Referring to FIG. 8, a waste conduit elbow 24 is connected at one end to a waste conduit (not shown) and at an opposite end to one end of coupling 26; an opposite end of coupling 26 is connected to and supports a waste conduit flange 28. Resting upon the waste conduit flange 28 is a wax sealing ring 22 in coaxial alignment. A toilet bowl fixture 11 is shown having a seat rim 12, an outflow channel 14, and a downflow channel 16. The lower end of downflow channel 16 defines a discharge flange 18 of tubular configuration. The area of the bowl 11 immediately adjacent to the discharge flange 18 provides an annular space 20 that overlies and rests upon the wax ring The discharge flange 18 is inserted inside, and is in intimate contact with, the inner diameter of the wax ring 22. Partially inserted into the wax ring 22 is the toilet guard of the present invention, denoted generally by numeral 30.

Figure 1:
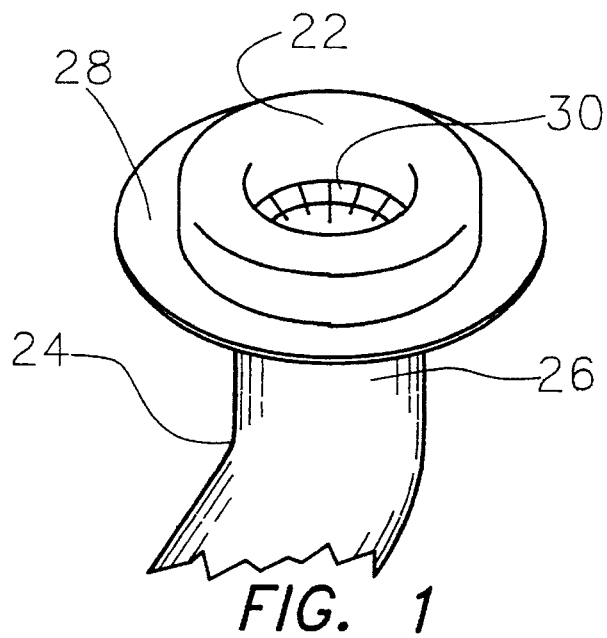
FIG. 1 is a perspective view of the toilet guard embedded in a wax ring and supported on the flange of a waste conduit.
Figure 2:
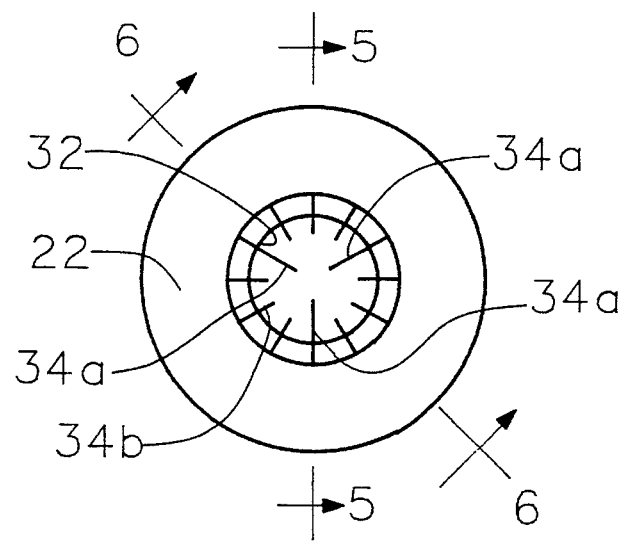
FIG. 2 is a top plan view of the toilet guard embedded in a wax ring.
Figure 3:
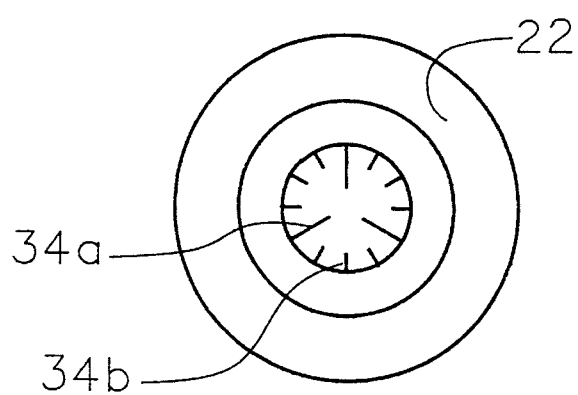
FIG. 3 is a bottom view of the same.
Figure 4:
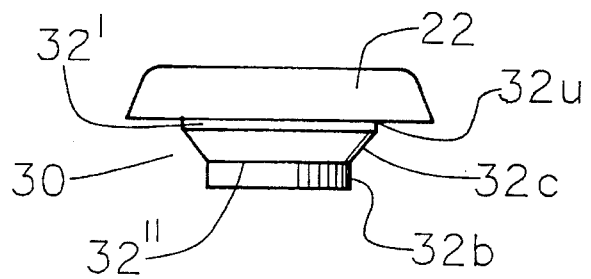
FIG. 4 is a side elevational view of the same.
Figure 5:
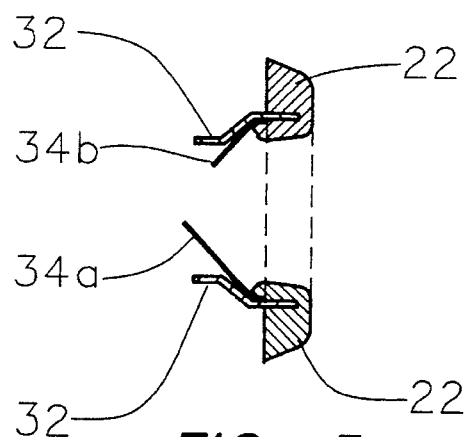
FIG. 5 is a section on the line 5—5 of FIG. 3.
Figure 6:
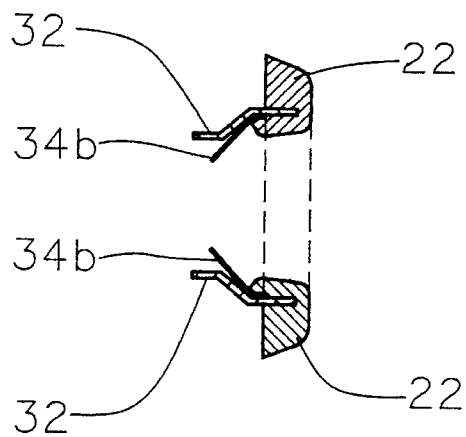
FIG. 6 is a section on the line 6—6 of FIG. 3.

Referring now to FIG. 1, the waste conduit elbow 24, coupling 26, waste conduit flange 28 and wax ring 22 are illustrated with the toilet bowl fixture 11 removed and with the toilet guard 30 partially embedded in the wax ring 22. As may be seen more clearly in FIGS. 2–4, the toilet guard 30 comprises a guard tube 32 and attached thereto a plurality of resilient, elongated members or wires 34a, 34b. The tube 32 is comprised of a relatively wide upper portion 32u and a narrower base portion 32b, joined by a central portion 32c. Referring particularly to FIG. 4, it may be seen that the central portion 32c is upwardly and outwardly flared so that the diameter of the upper margin 32' of central portion 32c equals that of contiguous upper portion 32u, and the diameter of the lower margin 32" of central portion 32c is equal to the diameter of the contiguous base portion 32b. The upper portion 32u provides a means for partially embedding the toilet guard in the wax ring 22: the wax ring 22 is positioned over the tube 32 in coaxial alignment therewith and then pressed down upon the tube 32 so that the upper portion 32u thereof penetrates into the wax ring 22. In an alternate embodiment, the upper portion 32u is eliminated and replaced by a plurality of upstanding prongs or cleats (not shown) attached at circumferentially-spaced points of upper margin 32' which cleats insert into the wax ring 22

Figure 7:
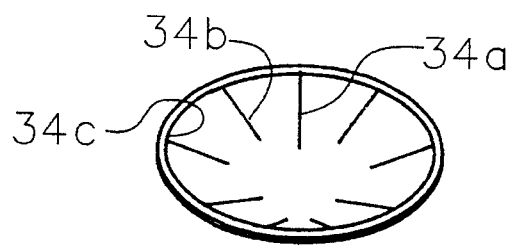
FIG. 7 is a perspective view of the toilet guard only.

In the preferred embodiment, the toilet guard 30 includes three relatively long wires 34a, each wire 34a having one end attached to a central portion 32c of the tube 32 at 120 degree intervals around the circumference thereof. The long wires 34a extend radially inward and depend angularly downward in the direction of discharge of water from the toilet bowl fixture 11 when the toilet is flushed. The preferred embodiment includes three relatively short wires 34b attached to a central portion 32c of tube 32 that is, a total of nine short wires, at the 1, 2, 3, 5, 6, 7, 9, 10, 11, o'clock positions, as viewed in FIG. 3. The short wires 34b also extend radially inward and depend angularly downward. Thus, the combination of the long wires 34a and the short wires 34b suggest the shape of a truncated cone, as may be seen in FIG. 7.

The length of the long wires 34a is chosen to leave only a small gap between the free ends of the wires 34a. Nevertheless, when the toilet is flushed no clogging of the discharge passage 16 occurs. By bending radially outward, the flexible, resilient wires 34a, 34b, of the toilet guard 30 permit easy passage of human waste and wads of toilet paper when the toilet is flushed. But, if a live animal attempts to move from a sewer line through the wax ring 22 and into the toilet bowl fixture 11, the animal will meet an impenetrable barrier: force applied by an animal to the wires 34a, 34b, in a direction opposite to the normal flow direction moves the wires 34a, 34b further inward, thereby further reducing the space available for movement into the toilet bowl fixture 11.

The wires 34a, 34b of the toilet guard are preferably made from polished stainless steel, but they may also be made of a suitable flexible, resilient and durable plastic or other suitable material. The tube 32 of the toilet guard is preferably made from the same or similar materials. While the invention has been described with respect to a preferred embodiment thereof, it will be appreciated by those skilled in the art to which this invention pertains that additional modifications can be made in the invention without departing from the spirit and scope thereof.

I claim:

1. A guard for repelling animals from entering a toilet bowl fixture installed on a wax sealing ring attached to a waste conduit, comprising:

a guard tube having an upper, relatively wide portion for insertion into the wax sealing ring, and a lower, relatively narrow portion, joined by an upwardly and outwardly flared central portion; and a plurality of flexible, resilient wires having a base end attached to an interior of the guard tube and having an opposite free end extending longitudinally and radially inward in a generally truncated, conelike, formation;

whereby the wires present an obstruction to an animal that attempts to enter the fixture by movement through the wax sealing ring.

2. The guard of claim 1 wherein three of the wires are relatively long, the base ends of the relatively long wires being attached to a central portion of the guard tube at 120 degree intervals around the circumference thereof, corresponding to the four, eight and twelve o'clock positions of a clock face.

3. The guard of claim 2 wherein the base ends of the relatively short wires are attached to a central portion of the guard tube at positions corresponding to the one, two, three, five, six, seven, nine, ten and eleven o'clock positions of a clock face.

4. The guard of claim 3 wherein the guard tube and wires are made from stainless steel.

5. The guard of claim 1 further comprising a wax sealing ring to which the guard is attached.

\* \* \* \* \*